United States Patent [19]

Martin

[11] Patent Number: 4,600,870
[45] Date of Patent: Jul. 15, 1986

[54] DUAL CONTROLLER POSITION CONTROL SYSTEM

[75] Inventor: Anthony N. Martin, Simsbury, Conn.

[73] Assignee: United Technologies Corporation, Hartford, Conn.

[21] Appl. No.: 552,898

[22] Filed: Nov. 17, 1983

[51] Int. Cl.$^4$ ............................................. G05B 11/42
[52] U.S. Cl. .................................. 318/610; 318/490; 364/162; 340/825
[58] Field of Search ............... 318/609, 610, 565, 490; 364/162, 105, 160, 161, 163; 340/825

[56] References Cited

U.S. PATENT DOCUMENTS

| | | | |
|---|---|---|---|
| 4,163,279 | 7/1979 | Kubota | 364/105 |
| 4,236,202 | 11/1980 | Giles et al. | 364/105 |
| 4,268,784 | 5/1981 | Ganaway | 318/610 |
| 4,390,942 | 6/1983 | de Keizer | 318/610 X |
| 4,539,663 | 9/1985 | Shigemasa et al. | 318/610 X |

*Primary Examiner*—B. Dobeck
*Attorney, Agent, or Firm*—Francis J. Maguire, Jr.

[57] ABSTRACT

A position control system having dual controllers, each capable of operating in either a proportional or a proportional plus integral gain mode, is normally operated with one controller in the proportional plus integral mode and the other in the proportional mode, each controller contributing its proportionate part of the output position control signal to the position controlled device, and each controller capable of operating alone in the proportional plus integral mode in the event of a failure.

10 Claims, 7 Drawing Figures

4,600,870

DUAL CONTROLLER POSITION CONTROL SYSTEM

DESCRIPTION

1. Technical Field

This invention relates to position control systems, and more particularly to position control systems having proportional plus integral gain.

2. Background Art

As known in the art, position control systems include types having proportional gain only and other types having proportional plus integral gain. Each type is responsive to a difference signal magnitude between a selected position signal and an actual position signal to provide an output signal as a function of the difference signal. The output signal causes a change in the position of an actuator which has the effect of minimizing the difference signal.

Systems using proportional gain exhibit fast ("stiff") response but retain a nonzero difference signal and an offset between the selected position and the actual position. The magnitude of the offset depends on the magnitude of the proportional gain, i.e. a high gain produces a small offset and vice versa. Integral gain is usually added in parallel with the proportional gain to eliminate this effect. Thus, if the difference signal is provided to a controller having proportional plus integral gain, the difference signal is quickly provided to the controlled unit via proportional gain and the integrator then acts to reduce it to zero thereby eliminating the offset.

The reliability of an electronic position controller is increased by using redundant controllers. The most effective method of combining two electronic controllers in such an arrangement is to have each perform identical calculations based on the same difference signal, and to sum the output from each controller at the interface with the controlled unit. If each controller has proportional plus integral gain, each integrator will attempt to reduce the error signal to zero at its input but, since each controller will always compute a difference signal having a value slightly different from the value computed in the other controller because of tolerance differences in the hardware, a zero difference signal in both controllers can never be practically achieved, resulting in the unacceptable dynamic situation of the two controllers "fighting" each other.

The prior art solution to this problem is to exchange data between the two controllers so as to produce an equal average difference signal in both channels. Such an approach requires the addition of a high cost intercontroller communication path such as a high speed digital data link which eliminates fighting but adds complexity and the potential for a common failure mode whereby some component failures could affect both controllers simultaneously, with the consequent total loss of control function.

DISCLOSURE OF INVENTION

An object of the present invention is to provide a high reliability position control system having proportional plus integral gain to regulate the position of a controlled device in dependence on the difference signal magnitude between the device actual position signal and a selected position signal.

According to the present invention, a high reliability position control system includes dual controllers, each operable in either of two selectable modes including a proportional gain mode and a proportional plus integral gain mode, and each responsive to the difference signal magnitude between the actual and selected positions of the controlled device, the controllers operating simultaneously in different modes and, in the event of failure of one controller, the remaining controller operating in the proportional plus integral gain mode, so as to provide in simultaneous or individual operation a proportionate part, or the whole of, a position control signal for regulating the position of the controlled device, the control system further including coupling circuitry responsive to the outputs from both of the controllers for presenting the whole or proportionate position control signals from each to the controlled device.

In further accord with the present invention, each controller includes a bias signal source for providing to the associated proportional gain apparatus an input bias signal at all times, thereby providing a proportional gain signal component in the output position signal of each, whereby in the event of a failure of one controller the remaining controller provides full proportional plus integral gain mode control with minimum transient effects. A two-times gain changer is utilized during such a failure to double the magnitude of the output signal of the surviving controller. This also aids in reducing transients.

The controller of the present invention provides dual controller reliability at low cost by eliminating the need for expensive intercontroller communication. This is achieved by providing proportional plus integral gain in both controllers and by inhibiting integrator action in one controller unless the other fails. At the same time a bias signal augments the difference signal presented to each controller's proportional gain apparatus, thereby ensuring a nonzero output signal magnitude from both controllers even in the presence of a zero valued difference signal. Transient effects are thereby ameliorated in the event of a failure of the controller operating in the proportional plus integral mode.

The foregoing and various other features and advantages of the present invention will become more apparent in the light of the following detailed description of a best mode embodiment thereof, as illustrated in the accompanying drawing.

BEST MODE FOR CARRYING OUT THE INVENTION

Figure 2:
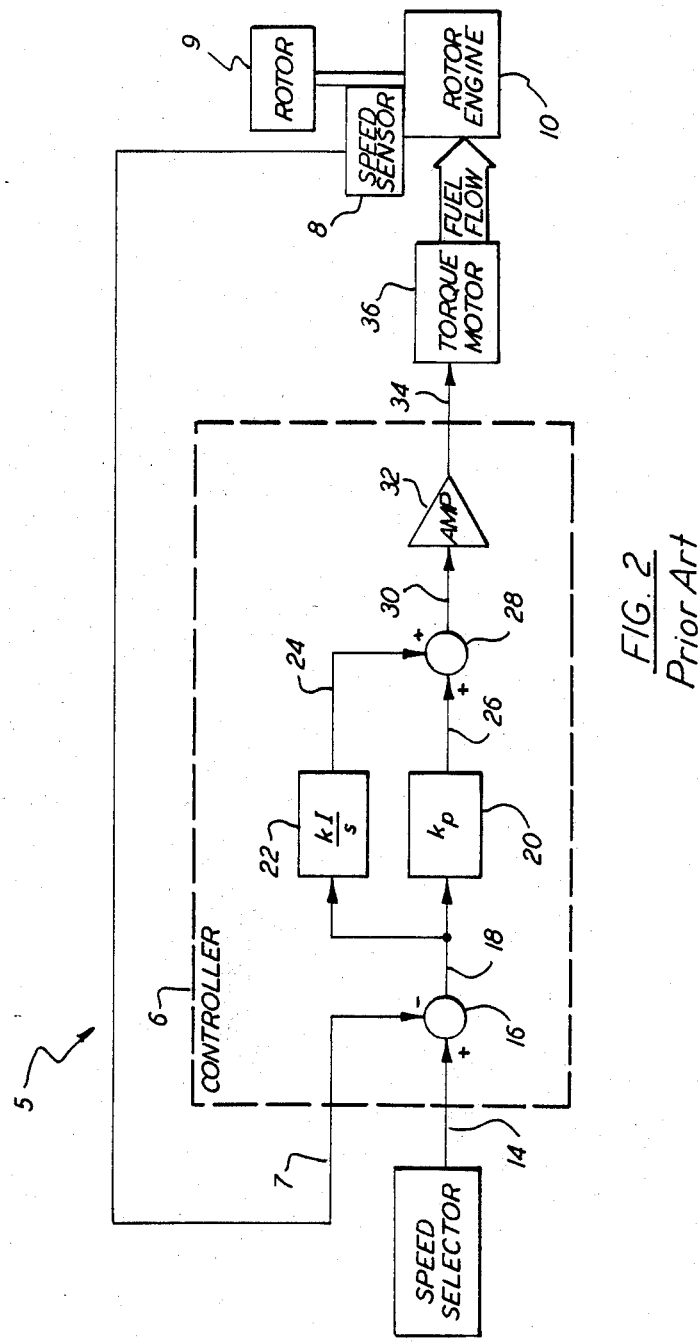
FIG. 2 is a simplified block diagram of a prior art single controller helicopter speed governor having proportional plus integral gain.

Referring first to FIG. 2, a system level diagram of a prior art helicopter speed governor system 5 is shown. The system is designed to maintain the value of a controlled parameter (rotor speed) at a commanded value. A controller 6 responds to a sensed speed signal on a line 7 from a speed sensor 8 which monitors the speed of a helicopter rotor 9 driven by a rotor engine 10. The controller also responds to the present value of a command signal on a line 14, representative of a selected value of the rotor's speed. Each of the signals are presented to a summing junction 16 where the sensed speed signal and the command signal are summed, producing a difference signal on a line 18. The difference signal is presented simultaneously to a proportional gain multiplier 20 and to an integrator 22. The resulting integrated signal is presented on a line 24 and the proportional signal is presented on a line 26 to a summing junction where they are summed, and which provides a sum proportional plus integral gain signal on a line 30 to an amplifier 32. The amplified signal from the amplifier, on a line 34, is presented to a torque motor 36 which changes its position in response thereto. The change in position of the torque motor results in a change in the fuel flow to the rotor engine 10 which causes a speed change that is sensed by the speed sensor 8 which provides the sensed speed signal on the line 7 to the controller 6.

Figure 1:
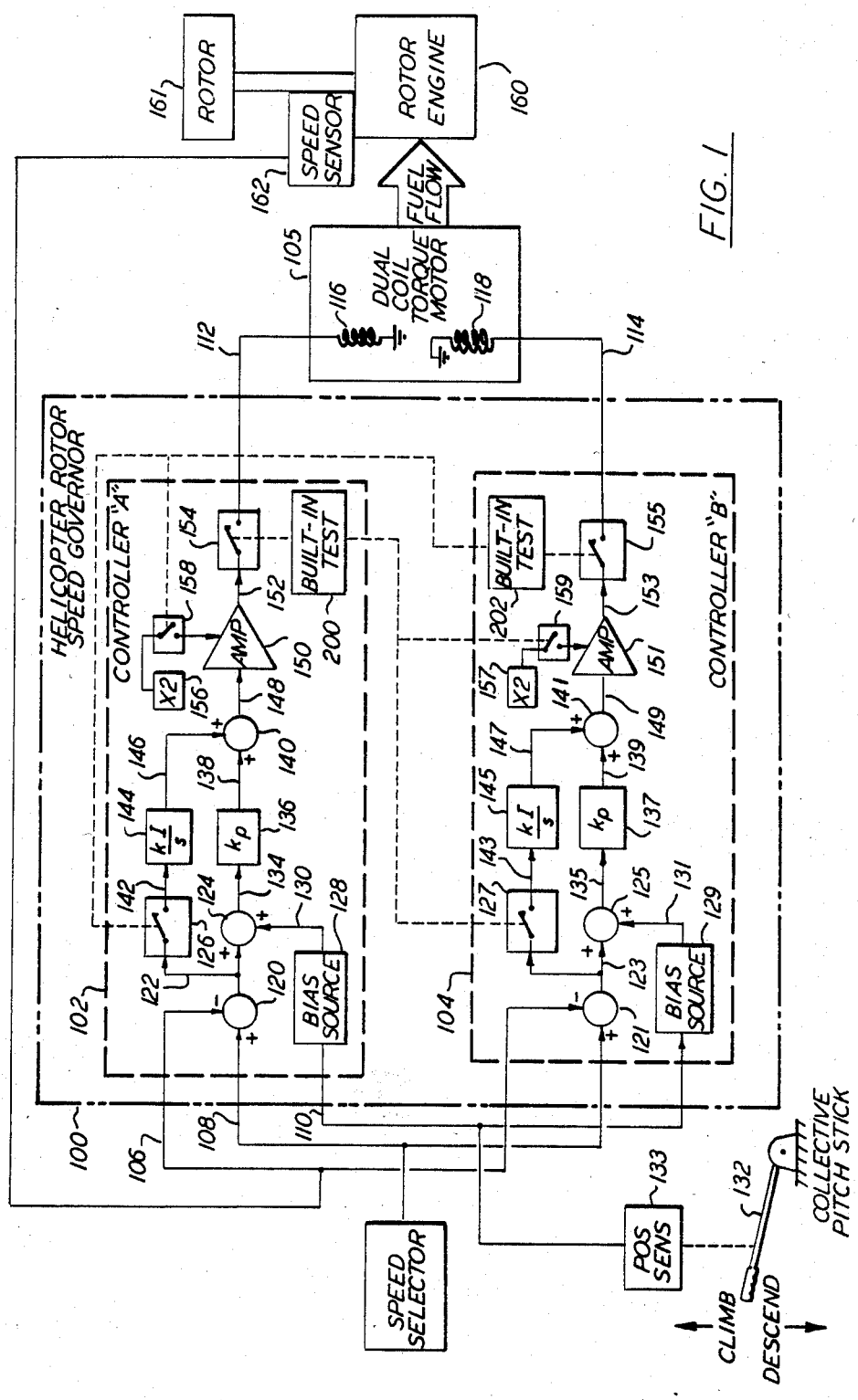
FIG. 1 is a simplified system level block diagram of the present invention for use as a helicopter rotor speed governor.

Referring now to FIG. 1, a system level diagram of the control system 100 of the present invention for use as a helicopter rotor speed governor is shown. The system level diagram is used to facilitate a clear understanding of the invention. The best mode embodiment of the invention as a digital control system is also disclosed, in detail, hereinafter.

The system includes dual controllers 102, 104 which may be identical and which operate simultaneously under normal conditions to control the position of a dual coil torque motor 105. Each controller receives: an actual rotor speed signal on a line 106, a selected rotor speed signal on a line 108, and a collective pitch signal on a line 110, and each controller is connected at its output to the torque motor 105. Although identical, under normal conditions one of the controllers, e.g. controller 102 is operated with proportional plus integral gain while the other controller (104) is operated with proportional gain only. Either controller may be selected for proportional plus integral gain operation, however, only one controller can operate with proportional plus integral gain at any given time. For purposes of clarity in description the controller selected for proportional plus integral gain will be referred to as "Controller A" (e.g. 102) and the second controller will be referred to as "Controller B".

Although the preceding and subsequent system level description of the present invention discloses dual speed governor controllers 102, 104 used to control the position of a dual coil torque motor 105, it should be understood that such controllers are generally usable in any position control system.

As discussed hereinbefore, controllers using proportional plus integral gain cannot be used simultaneously to control the same device without adding an expensive intercontroller communications link. The present invention avoids the use of such a link by operating the controllers in different modes. If a Controller "A" failure is detected it is disabled and Controller "B" is switched into the proportional plus integral mode and takes over the entire control function. Should Controller "B" fail, it is disabled and Controller "A" assumes total control to be described in more detail hereinafter.

There is a restriction in combining two dissimilar output signals on lines 112, 114. Since the output signal on each of the lines 112, 114 is derived from separate amplifiers, to sum the signals together by jointly coupling them to a single torque motor coil would require electrical isolation circuits. Therefore, the output signals on the lines 112, 114 are coupled by use of separate coils 116, 118 which operate independently, but which together control the displacement of the torque motor 105. The two output signals may be coupled in this way without adversely affecting the operation of either controller.

Both controllers 102, 104 sum the rotor speed signal on the line 106 with the selected speed signal on the line 108 at junctions 120, 121 to provide difference signals on line 122, 123 to summing junctions 124, 125 and switches 126, 127. The collective pitch signal on the line 110 is provided to bias signal sources 128, 129 to be described in detail hereinafter, provide bias signals on lines 130, 131 to the summing junctions 124, 125. The bias signals vary according to the load on the helicopter rotor as controlled by the position of a collective pitch stick 132. A position sensor 133 provides the signal on the line 110 that varies according to the stick position.

The summing junctions 124, 125 provide summed signals on lines 134, 135 to proportional gain multipliers 136, 137 which provide proportional signals on lines 138, 139 to summing junctions 140, 141. The difference signals on the lines 122, 123 that are provided to the switches 126, 127 are in turn provided on lines 142, 143 to integrators 144, 145 if the switches are closed. If Controller "A" is selected as the proportional plus integral controller, the switch 126 is closed and the Controller "B" switch 127 is opened under normal operating conditions. The integral signal on a line 146 is summed with the proportional signal on the line 138 at the summing junction 140. Similarly, if a failure condition exists in Controller "A" the Controller "B" switch 127 is closed, the integral signal on the line 147 is summed with the proportional signal on the line 139 at the summing junction 141. The signals on lines 148, 149 are amplified in amplifiers 150, 151 respectively, which provide amplified signals on lines 152, 153 to switches 154, 155 which are both closed under normal operating conditions, and which provide the output signals on the lines 112, 114 to the torque motor 105.

The amplifiers 150, 151 provide suitable scaling of the signals on the lines 148, 149 prior to presentation to the torque motor. The scaling factor, i.e. gain of the amplifier, is selected based on normal system operation. In the event of controller failure, however, it may be desirable to change the gain. Therefore, gain changers 156, 157 are associated with each of the amplifiers 150, 151. If a controller fails, the remaining controller's amplifier gain is increased, typically doubled, by closing associated switches 158, 159. This reduces the magnitude of the resulting transient that occurs upon controller failure.

The fuel flow to a rotor engine 160 varies according to changes in the position of the torque motor 105 which is controlled by the position output signals from the controllers on the lines 112, 114. The speed of the rotor 161 varies with engine speed which varies according to fuel flow. A speed sensor 162 monitors the speed of the rotor 161 and provides the actual rotor speed signal on the line 106 to each controller.

The bias signal sources 128, 129 provide similar amplitude bias signals to each controller's proportional gain multiplier so that each provides a proportional output signal on the lines 112, 114 of essentially equal magnitude, and which increases with load. Since the magnitude of the output control currents on the lines 112, 114 must increase with increased rotor load in order to maintain speed, it is advantageous also to increase the bias currents' magnitude under increased load. This allows the bias currents to "keep pace" or to "track" increases in the magnitude of the control currents. Thus, if the magnitude of the Controller "A" bias plus control current on the line 112 is, under all loading conditions, of the same order of magnitude as the Controller "B" bias plus control current on the line 114, then the transient associated with a Controller "A" failure is reduced. When combined with a two-times gain changer function, this ensures that the total control function takeover that occurs upon a single controller failure is relatively free from a large transient. For example, in the absence of bias source signals, if the difference signal in each controller were zero or near zero, the proportional plus integral controller would have some nonzero output signal value while the proportional controller would have a zero or near zero output signal value. In the event of a failure of the proportional plus integral controller, the surviving controller would be immediately required to provide the equivalent signal to the torque motor formerly provided by the failed and surviving controllers combined. The magnitude of the transient would depend on the magnitude of the failed controller's output signal at the time of the failure. Bias signals to each multiplier's input provide at least some nonzero output bias current on the lines 112, 114. Together with the doubling in magnitude of the output signal the transient is minimized.

The position of the collective pitch stick 132 is used as an indication of loading although any other power required parameter may be used as well. The output signal on the line 110 of the position sensor 133 is provided to the bias sources 128, 129 which provide the bias signals on the lines 130, 131 according to a predetermined relationship that exists between increased collective pitch setting and power required. Additional signals such as altitude or cyclic pitch may also be used to refine this relationship. Since movement of the collective pitch stick "anticipates" rotor speed changes resulting from load changes, the bias sources 128, 129 are used not only to reduce a failure transient, but also to directly increase or decrease the fuel flow to the rotor engine 160 according to the predetermined relationship and the present value of the position of the collective pitch stick 132. This further improves the dynamic response of the system.

A built-in test device 200 for Controller "A" and an identical device 202 for Controller "B" each monitor selected controller failure criteria. This particular failure criteria selected will depend on the particular embodiment and are described hereinafter with respect to the best mode embodiment of FIG. 3. In FIG. 1 the built-in test devices cause the switches 126, 127, 154, 155, 158, 159 to open or close in response to failure conditions in the controllers. Under normal operating conditions switches 154 and 155 are closed and switches 158, 159 are open.

In operation, if Controller "A" is selected as the controller providing integral gain then the switch 126 is closed and the switches 127, 158, 159 are opened under the normal operating condition. Should the built-in test device 200 associated with Controller "A" detect a failure condition within its controller it will simultaneously cause the switch 154 to open and the switches 127, 159 to close. Thus, the coil 116 in the torque motor 105 will become deactivated, the gain of the amplifier 151 will be doubled, and the integrator 145 of Controller "B" will be activated, causing Controller "B" to operate with proportional plus integral gain. Closure of switch 159 results in a doubling of amplifier 151 gain thus helping to reduce the transient disturbance. The torque motor coils 116, 118 are designed so that each can either operate together with the other or alone to effectuate the control function.

Similarly, if the Controller "B" built-in test device 202 detects a failure, switch 155 is opened and coil 118 deactivated. Switch 126 remains closed and switch 158 closes. (Actually, once a controller is selected to be the one having proportional plus integral gain, there is no real need for that controller to have the capability of disabling its integrator; e.g. if Controller "A" is chosen as the proportional plus integral controller there is no need for the switch 126 since there is no reason ever to open it. However, it is much cheaper to produce identically designed controllers and the switch 126 is therefore incorporated for that reason.)

Figure 3:
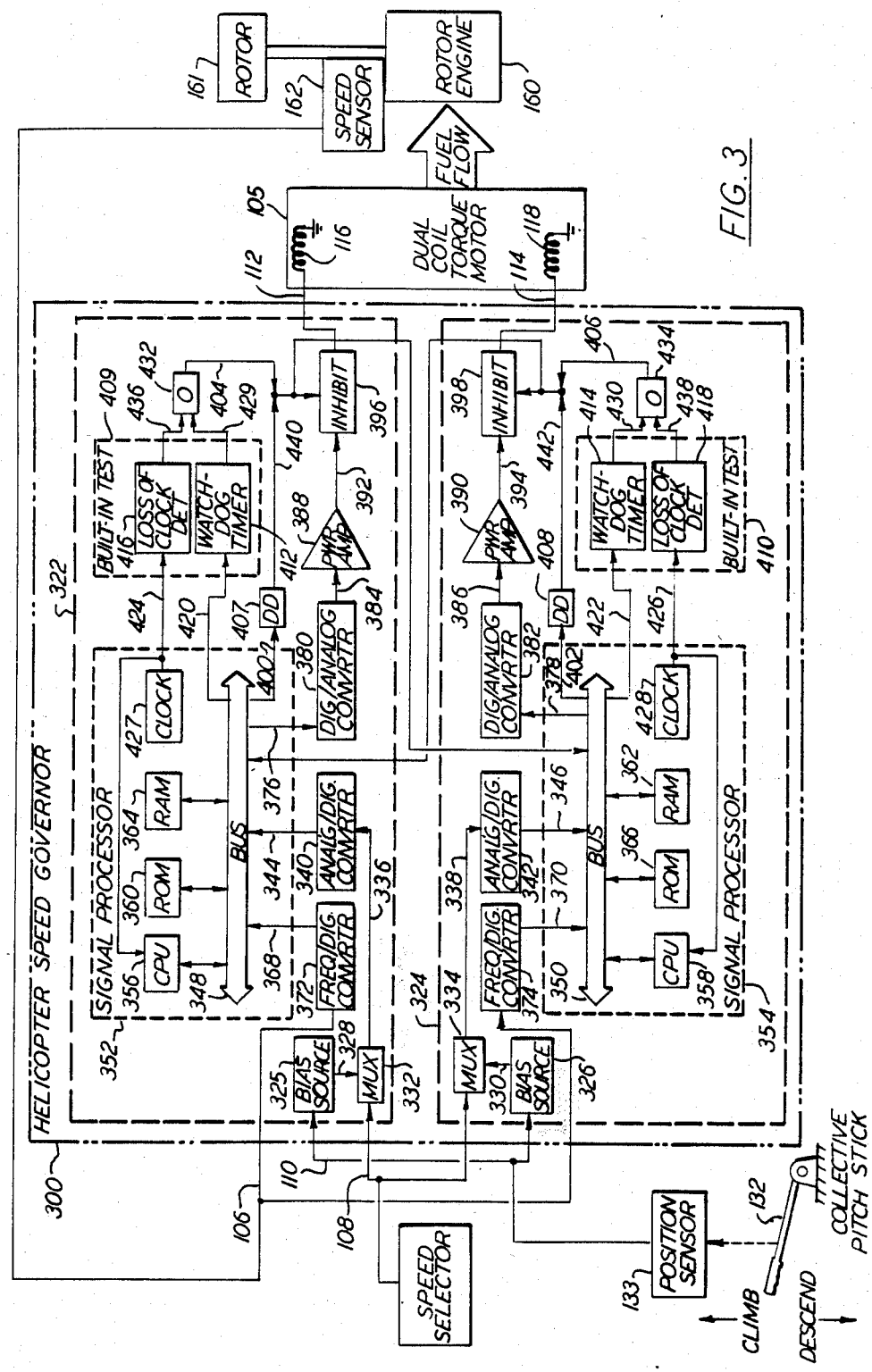
FIG. 3 is a simplified block diagram of a best mode digital embodiment of the present invention for use as a helicopter rotor speed governor.

Referring to FIG. 3, in a best mode embodiment of the present invention as a digital control system for a helicopter speed governor 300, dual controllers 322, 324 each include associated bias sources 325, 326 responsive to the collective pitch signal on the line 110, as described hereinbefore with respect to FIG. 1. In FIG. 3, each bias source provides an analog signal on lines 328, 330 to an associated multiplexer 332, 334 which also receives the selected rotor speed signal on the line 108; and which multiplexes both bias signal and select speed signal over related lines 336, 338. The multiplexed signals are presented to associated analog/digital (A/D) converters 340, 342 which provide the corresponding digital multiplexed signals on output lines 344, 346 to buses 348, 350 of associated signal processors 352, 354. The signal processors are of a type known in the art, which include a central processing unit (CPU) 356, 358, random access memory (RAM) 360, 362 and read only memory (ROM) 364, 366. Each processor also receives the actual rotor speed signal provided on lines 368, 370 by associated frequency to digital converters 372, 374, which convert the sensed rotor speed signal on the line 310 to digital form. Each signal processor responds to the bias, actual speed, and select speed signals to provide an output position control signal on lines 376, 378 as described hereinafter with respect to FIGS. 4a–4d.

Each controller includes digital/analog (D/A) converters 380, 382 which convert the processor output signals on lines 376, 378, to corresponding analog equivalents on lines 384, 386, which are provided to power amplifiers 388, 390 which amplify the position control signals to a level necessary to drive the respective coils in the dual coil torque motor 304. The amplified position control signals at the amplifier outputs on lines 392, 394 are presented to inhibit switches 396, 398 which open to disable the controller output in the presence of disable signals on lines 400, 402, 404, or 406.

The disable signals may be generated by either software or hardware. Software disable signals on lines 400, 402 drive the inhibit switches 396, 398, respectively via discrete drivers 407, 409, and are generated by any one or more of the following test routines performed by each processor: (a) REFERENCE TEST, in which a reference parameter is compared with a corresponding stored parameter to determine if the input interface is operating properly; (b) RAM SCRATCHPAD TEST, in which a known signal quantity is stored in RAM and read back to determine if RAM storage is functioning properly; (c) ROM CHECK SUM, in which all data and instructions stored in ROM are added up to determine if the bit total is correct; and, (d) INTERFACE RANGE CHECKS, in which current values of selected parameters including collective pitch stick position, rotor speed, and speed select are compared to acceptable ranges to ensure that those parameters are within the acceptable boundaries. If any one or more of the above tests indicates a faulty processor, a flag "TEST-SELF", to be described in more detail hereinafter, is set equal to "1". At the same time, a flag "TEST-OTHER" is set equal to "1" in the other controller's processor. The flags "TEST-SELF" and "TEST-OTHER" are used in each controller as indicators of whether the controller or the other controller, respectively, has been disabled. If either of the status flags is set equal to the value "one" the disablement of the flagged controller is indicated. Similarly, a value of zero for a status flag indicates that the flagged controller is operating properly.

Each controller includes a built-in test device 409, 410 for providing hardware generated disable signals on the lines 404, 406. Each built-in test device includes a watch dog timer 412, 414 and a loss of clock detector 416, 418. Both the watch dog timer and the loss of clock detector include ramp generators responsive to periodic signals on the lines 420 and 422, provided by the signal processors 352, 354 and on the lines 424, 426 provided by clocks 427, 428. If the watch dog timer is not refreshed by an expected software generated refresh signal on the lines 420, 422 it will decay below a level at which its internal level detector will generate a disable signal on lines 429, 430 which are applied to an OR gate 432 or 434. Similarly, if either of the loss of clock detectors 416, 418 fails to receive a selected number of sequential clock signals, its ramp function will be unable to maintain a voltage above the level necessary to prevent the generation of a disable signal on one or the other of lines 436, 438. If either of the disable signals on the lines 429, 436 is provided to the OR gate 432 a hardware generated disable signal on the line 404 will be provided to the inhibit switch 396 and the controller's output on the line 112 will be disabled, thereby deenergizing its associated coil 116 in the dual coil torque motor 105. Similarly, if either of the disable signals on the lines 430, 438 are provided to the OR gate 434, a hardware generated disable signal on the line 406 will be provided to the inhibit switch 398 which disables the controller's output signal on the line 114 thereby deenergizing its associated coil 118 in the dual coil torque motor 105.

It should be observed that each of the hardware and software generated disable signals on the lines 404, 406 and 400, 402, respectively, are provided not only to the associated controller's inhibit switch 396, 398, respectively, but also to the other controller's signal processor 354, 352, respectively. It should be understood that the signals on the lines 400, 402 are presented to the discrete drivers 407, 408 in order to isolate the two signal processor buses 348, 350 and that the signals emerging from the discrete drivers on the lines 440, 442 are merely buffered equivalents of the signals on the lines 400, 402, respectively. Each processor utilizes a disable signal from the other controller for the TEST-OTHER flag in software to be described hereinafter.

Figure 4A:
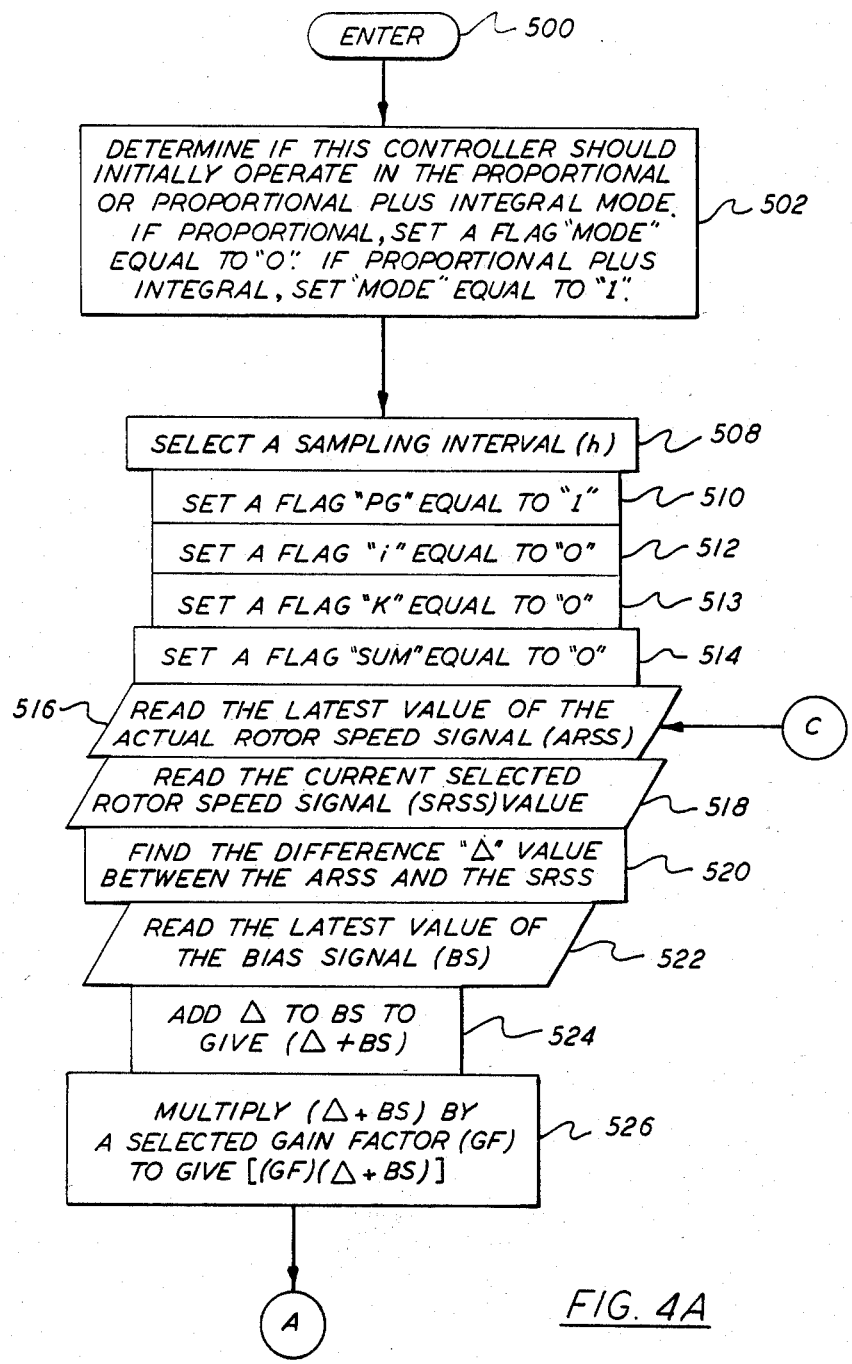
FIG. 4a, 4b, 4c, and 4d are a simplified flow chart of the steps executed by the signal processor of the digital embodiment of FIG. 3.

Referring now to the processor flow charts 4a–4d of FIG. 4, a flowchart of FIG. 4a shows the program of sequential instructions executed by the signal processor in each controller. The processor enters the flowchart at 500 and the program executes an instruction 502 in which it is determined if the particular controller should initially operate in the proportional or the proportional plus integral mode. If proportional, a flag named "MODE" is set equal to zero. If proportional plus integral, the flag "MODE" is set equal to one.

The program next executes an instruction 508 in which a difference signal sampling interval (h) is selected which is utilized in the integration part of the program to be described hereinafter.

A variable "PG" is initially set equal to one. The variable PG indicates the value of the factor used to multiply the summed proportional plus integral signal before being provided as the signal processor's output signal. The setting of an initial value of "one" to the variable PG merely indicates that both controllers are operating properly. If a TEST-OTHER status flag equal to one is received by the signal processor, the value of the variable PG will be set equal to two. This will cause, as explained hereinafter, the surviving controller to provide an output signal having a magnitude twice as large as it had on the previous cycle, thereby reducing any transients associated with the disablement of the other controller on the previous cycle.

The program next proceeds to an instruction 512 in which a flag "i" is set equal to zero. The flag "i" is used merely to indicate, in the integration part of the program, to be described hereinafter, whether the current pass through the loop is the first pass or a subsequent pass. This is necessary in order to satisfy a requirement of the computational steps contained in the trapezoidal method of integration to be described hereinafter.

A variable "k" is set equal to zero in the next instruction 513. It will be incremented by one on each pass through the loop until it reaches a selected value (n) at which point the software tests described hereinbefore are executed.

A variable "SUM" is set equal to zero in the next instruction 514. The variable "SUM" represents the current integral of the difference signal over time and is calculated according to the trapezoidal rule as described hereinafter.

Having completed the setting up of initial conditions for the execution of the main loop of the program, the program now proceeds to an input instruction 516 in which the latest value of the actual rotor speed signal (ARSS) is read into the signal processor and stored temporarily. Similarly, the current value of the selected rotor speed signal (SRSS) is read into the signal processor where it is stored temporarily as indicated by the instruction 518.

The difference value between the ARSS signal and the SRSS signal is determined in a computation instruction 520. The difference value is indicated by the upper case Greek letter delta ($\Delta$) in this and subsequent instructions. The difference value is also stored temporarily within the signal processor.

An input instruction 522 is used to read the latest value of the bias signal (BS). This value is also stored temporarily within the signal processor.

The program then proceeds to a computational instruction 524 wherein the current value of the variable $\Delta$ is added to the current value of the variable BS. This summed value is multiplied in the subsequent computational instruction 526 by a selected gain factor (GF) thereby accomplishing the proportional gain function.

Figure 4B:
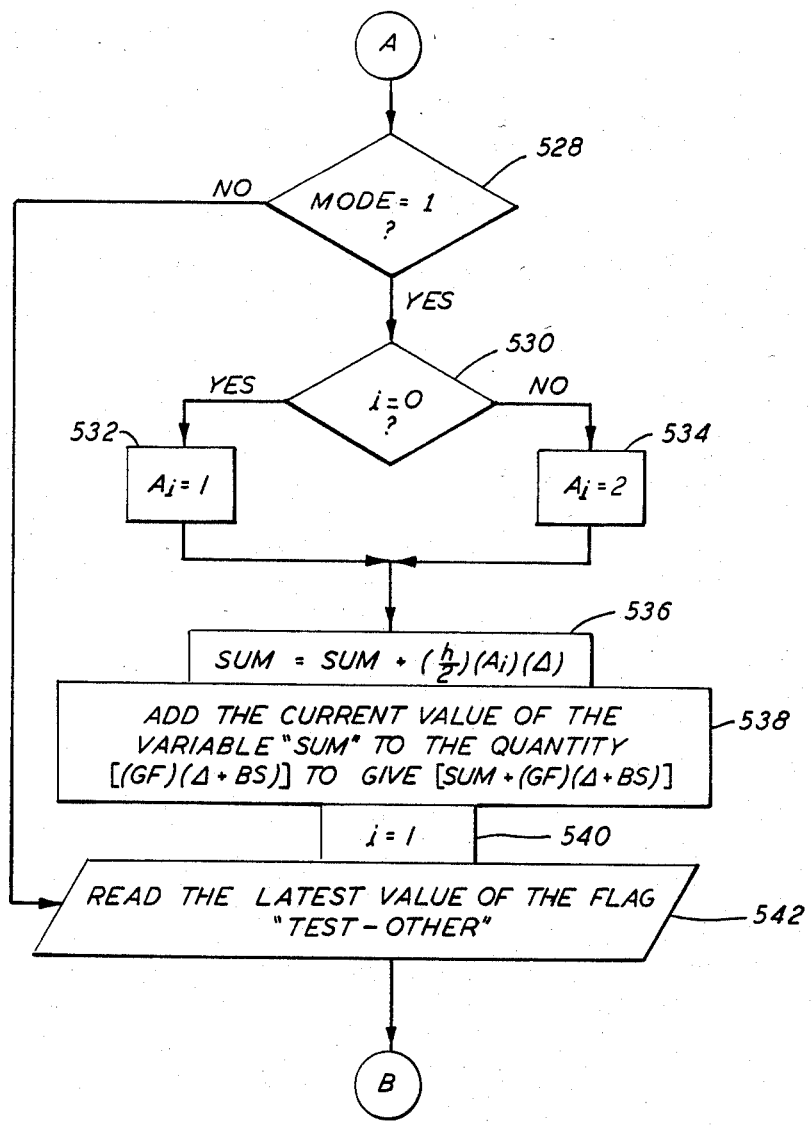
Figure 4C:
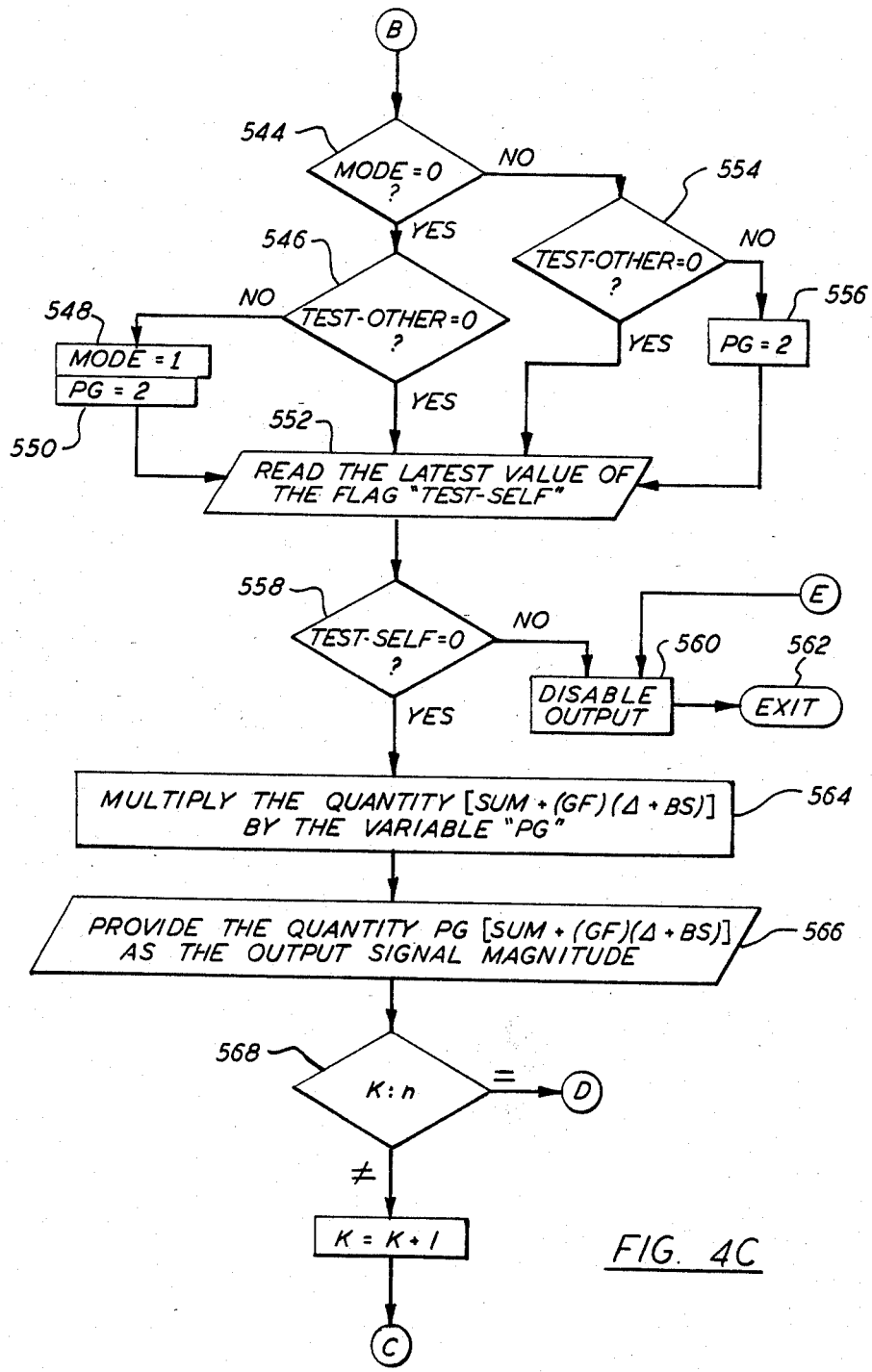

Referring now to FIG. 4b the program then proceeds into a decision instruction 528 wherein the current value of the variable MODE is determined. If the current value of MODE is not equal to the value one, the integration portion of the main loop is bypassed. This would indicate that the particular controller is operating in the proportional gain mode only. On the other hand, if the value of the variable MODE is equal to the value one, the controller is operating in the proportional plus integral mode and logical flow proceeds into a decision instruction 530. Because of the requirements of the well-known trapezoidal method of numerical integration, wherein the definite integral (I) of a function over an interval is given by the formula:

$$I = \int_{x_o}^{x_N} f(x)dx \doteq \sum_{i=o}^{N-1} I_i = \sum_{i=o}^{N-1} \frac{h}{2} [y_i + y_{i+1}]$$
$$\doteq \frac{h}{2} [y_o + 2y_1 + 2y_2 + \ldots + 2y_{N-1} + y_N]$$
$$\doteq \frac{h}{2} \sum_{i=o}^{N} A_i y_i$$

where
$y \equiv f(x)$ and $y_i$ denotes $f(x_i)$, and
$h \equiv$ a subinterval of constant value between $x_i$ and $x_{i+1}$, it is necessary to determine if the current pass through the main loop is the first pass through or a subsequent pass through. If the current pass through is the first, the program proceeds into an instruction 532 in which a variable $A_i$ is set equal to the value one. If, on the other hand, the current pass through is not the first, the program proceeds to an instruction 534 in which the variable $A_i$ is set equal to two. After properly setting the value of $A_i$, the program proceeds to a computational instruction 536 in which the current value of the integral variable SUM is added to a quantity (h/2) (AiΔ).

The program then proceeds to a computational instruction 538 in which the current value of the integral variable SUM is added to the proportional quantity [(GF) (Δ+BS)] to give the proportional plus integral quantity [SUM+(GF) (Δ+BS)]. The program next proceeds to an instruction 540 in which the variable "i" is set equal to one so that the variable $A_i$ will be equal to two on all subsequent passes through the main loop (in order to satisfy the equation given above for the trapezoidal rule).

The program now proceeds into an input instruction 542 where the latest value of the variable "TEST-OTHER" is read into the signal processor and temporarily stored. This instruction could also be entered by another route, i.e. if the flag MODE is determined to be not equal to the value one in decision instruction 528.

It is now necessary, according to the program for the particular controller to determine whether the other controller is operating properly or whether it has been disabled. This is necessary for two reasons. First, if the other controller has been disabled, the magnitude of the output signal of the surviving controller should immediately be increased to twice its former magnitude. This is accomplished by setting the variable PG equal to two. Second, if the disabled controller is the controller initially selected to operate in the proportional plus integral mode, the surviving controller should immediately change its operating mode from the proportional mode to the proportional plus integral mode. This is accomplished by setting the variable MODE equal to one. Of course, if the disabled controller is the one initially selected to operate in the proportional mode it is unnecessary to change the value of the variable MODE, since the surviving controller is already in the proportional plus integral mode. The flowchart illustrates these steps, in FIG. 4c, in the instructions 544 through 556. After reading the latest value of the variable TEST-OTHER in input instruction 542, the program enters into a decision instruction 544 in which it is determined whether the controller is operating in the proportional or the proportional plus integral mode. If operating in the proportional mode the flag MODE is equal to zero and the program enters into a decision instruction 546 in which the value of the variable TEST-OTHER is tested. If it is determined that the other controller is disabled, the program enters into an instruction 548 in which the flag MODE is set equal to one, which will cause the particular controller to be in the proportional plus integral mode during the next and all subsequent passes through the main loop. The variable PG is set equal to two in the next instruction 550 in the logical flow path. If the decision made in the decisional instruction 546 is that the other controller is not disabled, the logical flow will pass into the input instruction 552 and the operating mode and output gain of the particular controller will be unchanged.

If the decision made in decision instruction 544 is that the operating mode of the particular controller is the proportional plus integral mode, the program will proceed from block 544 into a decisional instruction 554 identical to, but separate from, decisional instruction 546. Once it is determined whether the other controller is operating properly or not, the program proceeds either into an instruction 556 (if the other controller is disabled) where the variable PG is set equal to two, or (in case the other controller is operating properly) directly into input instruction 552.

In any event the program will enter into input instruction 552 where the latest value of the variable TEST-SELF is read into the signal processor and temporarily stored. The variable TEST-SELF is then compared to zero in a decisional instruction 558 which transfers the program to an instruction 560 if the variable TEST-SELF is not equal to zero (indicating that the particular controller is not operating properly). The instruction 560 causes the output signal from the particular controller to be disabled and the program, for the particular controller, then comes to an end in the exit instruction 562.

On the other hand, if the particular controller is operating properly, the program will proceed into a computational instruction 564 wherein the quantity SUM+(GF) (Δ+BS) is multiplied by the variable PG which provides the appropriate gain factor to the output signal. The program next proceeds into an output block 566 which provides the quantity [PG (SUM+(GF) (Δ+BS))] as the particular controller's output signal magnitude.

Logical flow next proceeds into a decisional instruction 568 where the current value of the variable K is compared to a constant "n". The value of n is selected according to how often it is desired to execute the software generated tests described hereinbefore. For example, if the main loop is executed ten times per second, it might be desirable to execute the software tests every five seconds. In that case, the value of the constant n would be selected to be equal to fifty.

Figure 4D:
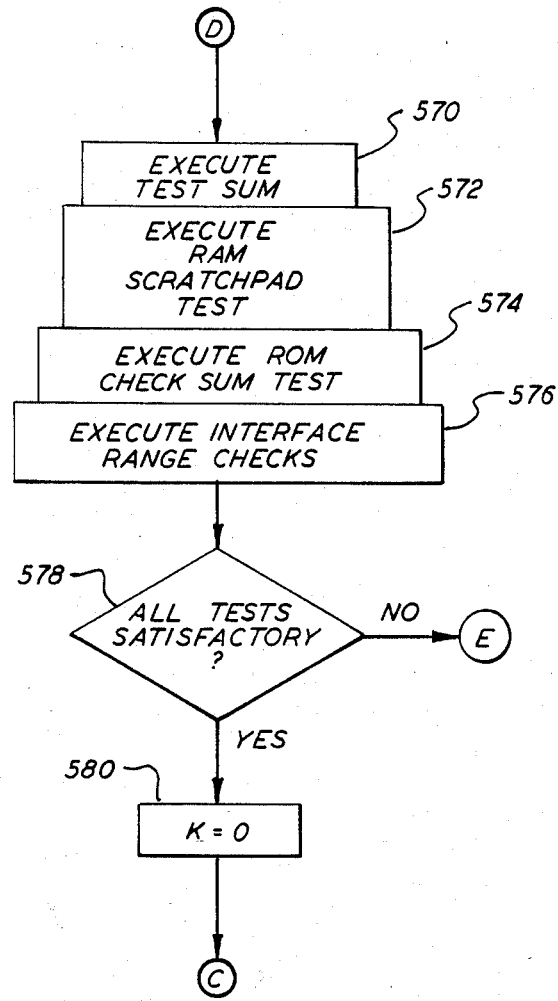

If the current value of K equals n, the program proceeds, in FIG. 4d, into a series of instructions 570, 572, 574, 576, in which the TEST SUM, RAM SCRATCHPAD TEST, ROM CHECKSUM TEST, and INTERFACE RANGE CHECKS, respectively, are executed. If any one or more tests indicates a failure, a decision is made in a decision instruction 578 to disable the output by directing the program into the instruction 560. If all tests are satisfactory, the program proceeds into an instruction 580, where the variable K is set equal to zero. This concludes a single pass through the main loop which is then reentered at input instruction 516 and which proceeds through the same sequence as just described in instructions 516 through 580, repeating the steps within the main loop indefinitely.

The helicopter rotor speed governor of the present invention provides a highly reliable dual controller configuration in which a first controller is operated under normal conditions with proportional plus integral gain simultaneously with a second identical controller operable with either proportional or proportional plus integral gain but normally operated with proportional gain only, each providing its output signal to a coupling device which permits each signal to exert its control function independently upon the controlled device. The proportional multiplier of each controller is biased with a bias signal which varies according to a sensed power demand parameter so that each controller provides output signals having the same order of magnitude thereby minimizing transients upon a single controller failure and also improving the aircraft performance under load. In the event of a failure of the first controller, its output signal is disabled and the second controller takes over the total control function, switching to its proportional plus integral gain operating mode and doubling the magnitude of its output signal. If the second controller is the one that fails, its output signal is disabled and the first controller takes over the total control function, remaining in its proportional plus integral operating mode and also doubling its output signal magnitude. Thus, a reliable and low cost dual controller proportional plus integral gain speed governor system is achieved.

It should be understood, however, that although the invention has been described in its best mode embodiment in the context of a very specific helicopter speed governor system, the invention is generally applicable to any position control system having proportional plus integral gain. Thus, the invention is not restricted to speed governors. Nor must the controlled device be a torque motor; independent coupling could be as easily performed with a transformer or some equivalent device. The use of bias sources and gain doublers are not absolutely essential for the practice of the invention but do alleviate transients during a failure. And the bias sources need not be related to the position of the collective pitch stick, but may be related to another sensed parameter related to load, or to any other factor.

It should also be understood that although the dual controllers of the present invention are shown in the context of a system using only one position controlled unit (a dual coil torque motor), it could as easily be shown in a system having two or more position controlled units. In such a system, the effects of changes in the positions of the individual units would be ultimately combined in some convenient manner to achieve the desired control function. For example, if it is desired to control the speed of the rotor of the helicopter shown in the best mode embodiment with two rotor engines, the output signals on the lines 112, 114 of FIG. 1 might be presented to separate torque motors, each controlling the fuel flow to the separate rotor engines.

Similary, although the present invention has been described as a "dual" controller position control system it should be understood that the invention is not necessarily restricted to the use of only two controllers. Any number of redundant controllers may be used to accomplish the objects of the invention while still remaining within its spirit and scope.

With regard to the digital embodiment shown in FIG. 3, it should be understood that various changes within each controller may be made without departing from the spirit and scope of the invention. For example, it is not absolutely necessary to multiplex the bias source signal with the speed select signal since each could be provided with its own analog/digital converter. Similarly, the speed sensor need not produce a frequency type signal but may instead provide an analog signal. In that case, the frequency/digital converter shown in the embodiment of FIG. 3 would be replaced by an analog/digital converter.

Similarly, the hardware associated with the signal processor need not be in exact correspondence to the hardware disclosed in the signal processor of the best mode embodiment. For example, the CPU may be a microprocessor or may utilize an existing processor external to the controller. Similarly, the type of memory used as ROM may include mask programmed ROMs, fuseable-link ROMs, alterable ROMs, or any other type of memory containing a "permanent" set of information written into memory, which under ordinary operation retains the contents of the memory unchanged. Similarly, the RAM shown in the processor of the best mode embodiment may include static random access memory (SRAM), dynamic random access memory (DRAM), or any other memory which serves the function of being capable of change during routine operation of the memory. It should also be understood by those skilled in the art, that the individual components described within the signal processor are not necessarily embodied in distinct packages but may be all included on or within the same hardware or functional package.

It should also be understood that the hardware and software tests provided in the best mode digital embodiment are capable of many variations without departing from the spirit and scope of the invention.

It should also be understood that the flowchart of FIG. 4 includes various program steps that could easily be rearranged, substituted, be added to, or subtracted from without departing from the spirit and scope of the invention. In addition, the method of integration described, i.e. the well-known trapezoidal method, could be easily replaced with another method such as the method of undetermined coefficients, the Newton-Cotes quadrature formulas, Gauss-Legendre Quadrature, Romberg's method, or any other equivalent method.

It should be understood by those skilled in the art that various other changes, omissions and additions in the form and details disclosed herein may be made without departing from the spirit and scope of the invention.

I claim:

1. Apparatus, responsive to a parameter actual value signal and a parameter reference value signal, for providing a position control signal for controlling the position of a controlled device in regulating the value of the parameter, comprising:
- dual controller means, each having summing means responsive to the parameter actual value signal and to the parameter reference value signal for providing a difference signal value therebetween, each of said controller means further including proportional gain function apparatus and proportional plus integral gain function apparatus, said controller means each operating, alternatively, in either a first selected mode for multiplying said difference signal value by said proportional plus integral gain function to provide a proportional plus integral position control signal, or a second selected mode for multiplying said difference signal value by said proportional gain function to provide a proportional position control signal, one of said controller means being selected for operation in said first selected mode at all times, the other one of said controller means operating in said second selected mode in the presence of said one of said controller means operating in said first mode and in said first selected mode at all other times, said controller means each providing said proportional plus integral position control signal and said proportional position control signal at a signal output of each; and
- coupling means, responsive to said proportional plus integral and said proportional position control signals from each of said controller means, for combining both to provide the position control signal to the controlled device.

2. The apparatus of claim 1, wherein each of said dual controller means includes:
- built-in test means, alternately responsive to actual operating signals of the selected one of said first and said second modes, and having means for storing reference signals having magnitudes indicative of corresponding desired operating signal magnitudes, said built-in test means comparing said reference signal magnitudes to said actual operating signal magnitudes of the selected mode of the associated controller means for determining a divergence therebetween and for providing a failure signal in the presence of said divergence; and
- mode-select means, responsive to said failure signal provided by said one of said controller means operating in said first mode, for causing in response thereto said other one of said controller means to operate in said first mode.

3. The apparatus of claim 2, wherein each of said dual controller means include controller output disabling means responsive to said failure signal for disabling said signal output of said associated controller means.

4. The apparatus of claim 2, wherein said dual controller means each include multiplier means responsive to said failure signal for amplifying the magnitude of said first and second mode position control signals in the presence of said failure signal and for not amplifying said first and second mode position control signals at any other time.

5. The apparatus of claim 1, wherein said dual controller means each include:
- bias source means for providing a bias signal at an output thereof; and
- summing means, responsive to said bias signal and to said difference signal, for providing a biased difference signal to said proportional gain function apparatus of the associated controller means for causing the associated mode position control signal to be at a nonzero value, whereby mode select transients are lessened.

6. A digital position control system, responsive to a parameter actual value signal and a parameter reference value signal, for providing a position control signal for controlling the position of a controlled device in regulating the value of the parameter, comprising:
- dual controller means, each having signal processor means responsive to the parameter actual value signal and to the parameter reference value signal for calculating and storing therein the difference signal value therebetween, said controller means each operating, alternately, in either a first selected mode for multiplying and integrating said stored difference signal value to provide a proportional plus integral position control signal, or a second selected mode for multiplying said stored difference signal value to provide a proportional position control signal, one of said controller means being selected for operation in said first selected mode at all times, the other one of said controller means operating in said second selected mode in the presence of said one of said controller means operating in said first mode, and in said first selected mode at all other times, said controller means each providing said first mode position control signal and said second mode position control signal at a signal output of each; and
- coupling means, responsive to said proportional plus integral and said proportional position control signals from each of said controller means, for combining both to provide the position control signal to the controlled device.

7. The apparatus of claim 1, wherein each of said dual controller means include:
- test means, alternately responsive to actual operating signals of the selected one of said first and said second modes, and having means for storing reference signals having magnitudes indicative of corresponding desired operating signal magnitudes, said test means comparing said reference signal magnitudes to said actual operating signal magnitudes of the selected mode of the associated controller means for determining a divergence therebetween and for providing a failure signal in the presence of said divergence; and
- mode-select means, responsive to said failure signal provided by said one of said controllers means operating in said first mode, for causing in response thereto said other one of said controller means to operate in said first mode.

8. The apparatus of claim 2, wherein each of said dual controller means include controller output disabling means responsive to said failure signal for disabling said signal output of said associated controller means.

9. The apparatus of claim 2, wherein said dual controller means each include multiplier means responsive to said failure signal for multiplying the magnitude of said first and second mode position control signals in the presence of said failure signal and for not multiplying said first and second mode position control signals at any other time.

10. The apparatus of claim 1, wherein said dual controller means each include:
- bias source means for providing a bias signal at an output thereof; and
- summing means, responsive to said bias signal and to said difference signal, for providing a biased difference signal to be multiplied proportionally in the selected mode of the associated controller means for causing the associated position control signal to be at a nonzero value, whereby mode select transients are lessened.

* * * * *